United States Patent Office 2,743,296
Patented Apr. 24, 1956

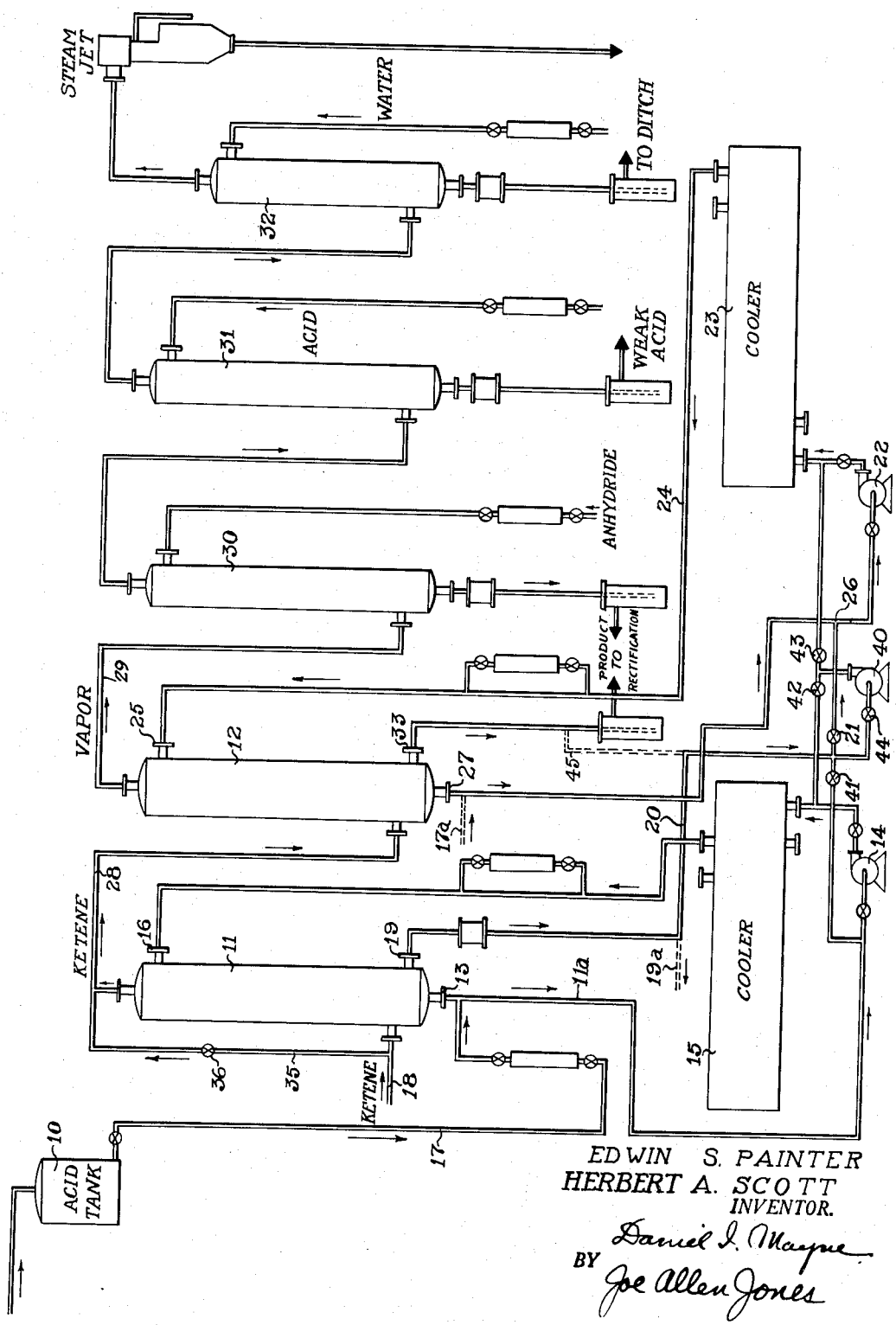

2,743,296

MANUFACTURE OF LOWER ALIPHATIC ACID ANHYDRIDES

Edwin S. Painter and Herbert A. Scott, Kingsport, Tenn., assignors to Eastman Kodak Company, Rochester, N. Y., a corporation of New Jersey Application November 30, 1951, Serial No. 259,152

3 Claims. (Cl. 260—547)

This invention relates to an improved process and apparatus for the manufacture of lower aliphatic anhydrides from lower aliphatic acids and a ketene. More particularly the invention is directed to the manufacture of acetic anhydride of high concentration and good color from acetic acid and ketene ($CH_2=C=O$), the reaction being carried out more efficiently than previously and with less loss of reactants and product due to polymerization and side reactions.

It has long been known that lower aliphatic anhydrides can be made by the reaction of lower aliphatic acids and a ketene. See, for example, U. S. Patents 1,898,687 and 1,926,642 and British Patents 237,575; 377,574; and 397,025. This process reached what was apparently its highest state of refinement, prior to the present invention, in a process and apparatus utilizing two scrubbers and which will be described herein in connection with the drawing appended hereto. The present invention represents an improvement in a number of senses over this prior process and apparatus, as will be explained presently.

In the prior art the usual method for conducting the reaction referred to above has been by countercurrent contact of a ketene with acid in a scrubber type of reactor packed with Berl saddles or other types of packing material to produce a large area of gas to liquid contact. Generally the reaction is carried out in two steps in which ketene and crude anhydride were fed to the primary stage and the unreacted ketene and highly concentrated acetic acid were fed to the secondary stage. By this procedure a limited amount of ketene was used in the primary stage to increase the concentration of the crude anhydride feed from 40-60 per cent anhydride to 70-90 per cent anhydride. The resulting crude anhydride was then rectified to produce a pure anhydride product. The residual ketene stream from the primary stage was fed into the secondary stage where it contacted acid and produced a crude anhydride of about 40 to 60 per cent anhydride.

In practice, the concentration of the crude anhydride product from the primary stage was held between 70 and 75 per cent to prevent excessive contamination from dissolved ketene and by-products. Even so the crude mixture was of a very dark color. More contaminated crude anhydride of a higher concentration was very difficult to rectify and produce a pure product within color specifications.

This procedure led to a prolonged time of contact of strong crude anhydride with a concentrated stream of ketene. Thus the ketene was allowed much time for polymerization and side reactions. The result was that the crude anhydride was contaminated and that the yield of acetic anhydride was reduced through the production of undesirable by-products from ketene.

We have found that these objectionable features can be overcome by absorbing and reacting to anhydride as much ketene as possible in the shortest possible time. Also by reducing the amount of ketene in contact with the concentrated crude anhydride mixture the partial pressure of the ketene can be reduced, and since the polymerization rate of ketene is a function of the partial pressure of the ketene, the loss to polymerization is reduced and the quality of the crude anhydride product greatly improved. Where former crude anhydride was a dark color, the crude produced by our process is clear to only slightly colored. The high quality of the crude anhydride produced according to our invention also allows the production of a crude of 85 to 90 per cent anhydride as compared to the former limit of 75 per cent anhydride in the crude mixture. The quality of this 90 per cent anhydride crude is much better than that of the 70 to 75 per cent crude produced in the former process.

By use of our invention the loss in ketene yield due to polymerization and side reactions is reduced by 40 to 60 per cent. In operating on a commercial scale this means a saving running into millions of pounds of acetic acid during one year of operation. Another advantage accompanying the decreased losses is the reduction in cleaning of equipment. Since less polymeric material is deposited in the reactor stages, cleanings are reduced by as much as 50 per cent, thereby effecting an appreciable saving in maintenance costs.

The production of a more concentrated crude anhydride mixture simplifies rectification problems and effectively increases the capacity of the distillation equipment for the production of pure acetic anhydride. Also the steam requirement for distillation per pound of anhydride is reduced.

According to our invention we carry out the reaction of a ketene (ketene or its aliphatic homologues) with acetic acid or other lower aliphatic acid in a system in which the liquid acid feed contacts the main stream of gaseous ketene in the primary stage where a crude anhydride mixture of 40 to 70 per cent anhydride is circulated. The liquid overflow from the first stage serves as feed in the second stage where the gas stream from the first stage, lean in ketene, contacts the liquid. Here the crude anhydride mixture is circulated and withdrawn or overflowed at a concentration of 85 to 90 per cent anhydride.

The crude product is nearly clear and produces only a very limited color in a sulfuric acid color test.

According to a modification of our invention, we can use a mixed flow system in which the ketene flow is split, with a portion entering the primary stage in contact with the acid feed and the remainder by-passed to the second stage where it is mixed with the residual gases from the first stage and brought into contact with the strong crude anhydride mixture. The overflow from the second stage contains from 80 to 90 per cent anhydride. The portion of ketene entering the first stage may be any fraction of the total from about 0.3 to 1.0. The operation is most efficient when about 80 per cent of the ketene is reacted in the first stage.

It is a primary object of our invention to provide an improved process and apparatus for reacting a ketene and a lower aliphatic acid whereby the reactants are used more efficiently and losses from polymerization and side reactions are reduced. Accompanying the achieving of this objective is a reduction in maintenance on the equipment.

Another object of the invention is to provide an improved process and apparatus for reacting a ketene and a lower aliphatic acid whereby a more concentrated anhydride is produced and the purification of this product to pure anhydride is made more economical.

A further object of the invention is to provide a process and apparatus whereby an increased amount of ketene is absorbed and reacted to anhydride in the shortest possible time.

Another object is to provide a process and apparatus whereby we reduce the amount of ketene in contact with concentrated crude anhydride mixture so that the partial pressure and thereby the polymerization rate of the ketene are reduced.

These and other objects of the invention will be apparent from the following specification and the accompanying drawing which is a diagrammatic representation of a process and apparatus for carrying out the invention, dotted lines being used to show the prior are arrangement referred to in the opening portion hereof.

In the figure there is shown at 10 an acid supply such as a tank containing highly concentrated acid, for example, glacial acetic acid. This tank supplies acid for reaction in the scrubbers or other gas-liquid contact devices 11 and 12. Scrubber 11 has a circulating leg 11a connected to the lower end of the scrubber at 13 and passing through a pump 14, a primary cooler 15 and back to the upper end portion of the scrubber at 16. Tank 10 is connected by a suitable line 17 to this circulating leg of scrubber 11 so that highly concentrated acid flowing from the tank is fed to the upper end of the scrubber 11 with the liquid reaction mixture which is withdrawn from the lower end of the scrubber 11. Freshly manufactured ketene is fed by line 18 to the lower portion of scrubber 11 so as to pass upwardly in the scrubber in countercurrent relationship with liquid entering the scrubber at 16.

The ketene and acid react in the scrubber 11 to produce acetic anhydride, and the liquid reaction mixture containing unreacted acid and approximately 40 to 70 per cent acetic anhydride is passed from a withdrawal or overflow opening 19 in scrubber 11 through a conduit 20, through a normally open valve 21, through pump 22 and through a secondary cooler 23. From this cooler the liquid passes through a conduit 24 to the upper end portion of the second scrubber 12 where it enters at 25. As will be seen from the drawing, the liquid overflow from scrubber 11 joins the circulating leg of scrubber 12 at 26, this circulating leg being attached to the lower end of scrubber 12 at 27.

Ketene which has not been reacted in scrubber 11 passes out of the upper end thereof to conduit 28 which feeds it to the lower end portion of scrubber 12. In this scrubber the unreacted ketene is passed in countercurrent contact with liquid which has been fed into scrubber 12 at 25, and any remaining unreacted ketene, as well as any other vapors, pass out through the upper end of scrubber 12 as shown at 29. A succession of scrubbers 30, 31 and 32 then serve to treat the ketene and the vapors successively with acetic anhydride, acid and water.

A liquid overflow or withdrawal opening is provided in the lower end of scrubber 12 as shown at 33, and the liquid product which is withdrawn and overflowed therefrom contains approximately 85 to 90 percent acetic anhydride which is then rectified in a suitable manner to produce a pure product.

A by-pass line 35 may be provided for connecting ketene feed line 18 with line 28 so as to by-pass scrubber 11, and this line 35 may be provided with a suitable valve 36 for controlling the volume of flow therethrough. When this valve is closed, the entire ketene supply passes through scrubber 11, but when it is desired to operate in accordance with the modification of the invention which has been mentioned previously herein, valve 36 may be opened to a desired extent to permit part of the fresh ketene to pass directly to scrubber 12. As stated above, it is desirable that from 30 to 100 per cent of the fresh ketene pass through scrubber 11, and the best efficiency is reached when about 80 per cent of the ketene is reacted in scrubber 11.

In addition to the valves and pumps to which reference has been made, an additional pump and various valves are shown in the drawing. Pump 40 is a spare pump connected so as to take the place of either pump 14 or pump 22, and valves 41, 42, 43 and 44 shown in the drawing are normally closed, that is, when pump 40 is not in use.

In order to render the invention more readily understood, a few dotted lines have been shown on the drawing to illustrate the best known prior art process and apparatus as mentioned above, and operation according to this prior art arrangement will now be described.

According to the prior art arrangement, feed from tank 10 entered the circulating leg of scrubber 12 by means of line 17a, line 17 not being provided. The ketene flow was substantially as shown in the present drawing except that there was no provision for by-passing some of the ketene around scrubber 11, as can be done by line 35. The overflow from scrubber 12 was connected by a line 45 to the circulating leg of scrubber 11, the horizontal portion of conduit 20 (as shown in the attached drawing) being eliminated, and the overflow from scrubber 11 being the product removal line 19a rather than the overflow conduit from scrubber 12. In operating according to this prior art arrangement, valves 42, 43, 44 and 21 were closed normally, and valve 41 was normally open, thus permitting the overflow from scrubber 12 to join the circulating leg of scrubber 11.

By comparing the old process and the new one, it becomes readily apparent that in the latter, the fresh ketene stream is immediately contacted with material containing a relatively high percentage of highly concentrated, unreacted acid in order to give a high rate of absorption and to react the ketene more rapidly, thus giving a lower residence time for unreacted ketene and substantially reducing the amount of ketene polymerization time involved. More complete utilization of the ketene feed also results.

In one example of operation according to the invention, acetic anhydride was produced by the reaction of ketene in the gaseous state with acetic anhydride in the liquid state in two packed tower type stages as shown and described herein. Acetic acid and ketene were fed to the first stage in a 1.2 to 1 molar ratio. In this unit a crude acetic anhydride-acetic acid mixture was produced at 50 to 70 per cent anhydride. This mixture was overflowed continuously to the second stage where it was fed into contact with the lean ketene-containing gas from the first stage. The composition of the crude mixture was increased to 80 to 90 per cent anhydride in the second stage. The crude anhydride was then rectified to produce a pure anhydride product.

The loss in yield in the reaction when conducted according to the process described as our invention was decreased by at least 50 percent with respect to operation according to the prior art which has been described. This was due to a decrease in ketene polymerization and side reactions.

In a second example, acetic anhydride was produced by the reaction of ketene in the gaseous state with acetic acid in the liquid state. The reaction was carried out in two packed tower type stages as shown and described above. Acetic acid was fed into the primary stage and about 80 per cent of the ketene stream was fed thereto. The crude anhydride mixture from the primary stage was fed into secondary stage along with a mixture of gases consisting of about 20 per cent of the original fresh ketene stream and the residual gases from the first stage. The crude anhydride was overflowed from the secondary stage at 80 to 90 per cent anhydride concentration. The losses from ketene polymerization and side reactions were reduced by about 50 per cent compared to operation according to the prior art discussed above.

In the two examples just given, the temperature in scrubber 11 was from 15 to 40° C. and the pressure 50 to 70 mm. Hg abs. The temperatures in each scrubber vary because of the exothermic nature of the reaction, the heat generated having the effect of increasing the temperature as the liquid flows down through the unit. The coolers 15 and 23 are operated so as to lower the temperature of the liquids entering the top of each scrubber to 15-20° C. Scrubber 12 operates at 15-30° C. and 50-70 mm. Hg abs.

This invention is applicable to the manufacture of acetic anhydride and higher aliphatic homologues from ketene and its homologues and the corresponding aliphatic acids such as acetic, propionic, and butyric. The reaction may be carried out at pressures ranging from 25 mm. Hg abs. to atmospheric and at higher pressures to about 10 atmospheres. The temperature range depends upon the vapor pressures of the materials used, but in the case of the manufacture of acetic anhyride temperatures from 0° C. to 100° C. are used and even lower and higher temperatures may be used, but temperatures outside the above range generally lead to low yields.

While we prefer to feed acid into the circulating leg 11a of scrubber 11, the acid could be fed separately into the upper end of scrubber 11 instead of entering this scrubber with the liquid being recirculated from the lower end of scrubber 11. Similarly, the overflow from scrubber 11, instead of being fed into the circulating leg of scrubber 12, could be fed separately into the upper end of scrubber 12. When using either or both of these variations the overall operation would be the same as in the preferred mode of operation, but these variations would be less convenient because they would require extra pumps, conduits, etc.

The improved results using the present invention apparently stem from use of concurrent flow in the overall system rather than the countercurrent flow generally used in absorption processes. (This is not to be confused with the use of the term countercurrent flow with regard to each individual scrubber or other gas-liquid contact device 11, 12, since countercurrent flow is used in each individual scrubber.) If the absorption of ketene were a simple process without polymerization and side reactions, countercurrent flow in the system would probably be preferable, but since side reactions were prevalent when operating according to the prior art, rapid utilization of ketene has provided a considerable improvement. By this invention about 60 to 80 per cent of the ketene is used in the primary reactor stage (scrubber 11) where the glacial acid feed is available for reaction to acetic anhydride. This lowers the partial pressure of ketene quickly and eliminates most of the side reactions in the second stage (scrubber 12) where only about 20 to 40 per cent of the reaction occurs. The rate of absorption of ketene in acetic acid is very high in our system; therefore, the acetic anhydride reaction is not impeded by a low vapor pressure of ketene in the second stage and the reaction goes to completion. The superiority of this process is that ketene is used more rapidly and in the first contact with acid. In the former process the main stream of ketene was passed through the first stage where only about 20 per cent was used. The remainder of the ketene was sent to the second stage where the main portion of the reaction took place. The partial pressure of ketene was high in both stages of the process and as a result a maximum quantity of by-products was produced.

The improvements noted as a result of this invention are:

1. *Improved quality of crude anhydride.*—The quality of crude anhydride mixtures has been greatly improved. Before this invention was used the crude anhydride contained many dissolved by-products and was a dark brown and sometimes even black color. Due to the content of impurities about 75 per cent acetic anhydride was the maximum concentration of crude that could be rectified to produce a high quality pure anhydride product. By the process described in this invention crude anhydride in concentrations as high as 90 per cent anhydride has been manufactured clear to light yellow in color. From these crudes a pure anhydride product of high quality has been produced.

2. *Reduction of losses.*—The losses in yield on a ketene basis in the scrubbing process have been reduced by 50 per cent. This reduction in loss means an overall economy running into millions of pounds of acetic acid per year in commercial operation.

3. *Reduction in maintenance.*—Due to the decreased production of tars and other by-products in the reactors the cleanings necessary have been reduced by about 30 per cent.

4. *Decreased steam consumption.*—By the production of a more concentrated feed to the anhydride rectifying stills the distillation may be carried out at lower reflux ratios thereby reducing the steam requirement per pound of anhydride produced.

We claim:

1. A process for the manufacture of lower aliphatic acid anhydride of high purity from ketene and lower aliphatic acid reactants, comprising feeding ketene and highly concentrated, anhydride-free lower aliphatic acid to a first gas-liquid contact zone where the initial contact of ketene and acid takes place to form a liquid reaction mixture, recycling the liquid reaction mixture through said first zone, withdrawing liquid reaction mixture from said first zone to a second gas-liquid contact zone, removing unreacted ketene from the first zone, passing said unreacted ketene, independently of the liquid reaction mixture, to said second zone for reaction with unreacted acid contained in the liquid reaction mixture, recycling the liquid reaction mixture in said second zone through said second zone, and withdrawing highly concentrated lower aliphatic acid anhydride from said second zone.

2. A process according to claim 1, wherein the acid is acetic acid and the anhydride manufactured is acetic anhydride.

3. A process according to claim 1, wherein the anhydride-free acid is fed to the recycle stream for said first zone and thus reaches said first zone via said recycle stream.

References Cited in the file of this patent

UNITED STATES PATENTS

| 1,898,687 | Rice | Feb. 21, 1933 |
| 2,072,093 | Blakey | Mar. 2, 1937 |
| 2,095,074 | Falck Muus | Oct. 5, 1937 |
| 2,160,177 | Shuman | May 30, 1939 |
| 2,235,561 | Nadeau et al. | Mar. 18, 1941 |
| 2,240,433 | Atwell | Apr. 29, 1941 |
| 2,286,504 | Barker | June 16, 1942 |
| 2,589,112 | Moise et al. | Mar. 11, 1952 |
| 2,688,635 | Eberts et al. | Sept. 7, 1954 |

FOREIGN PATENTS

| 237,575 | Great Britain | Oct. 22, 1925 |
| 468,218 | Great Britain | June 30, 1937 |